United States Patent [19]
Steinberg et al.

[11] Patent Number: 5,497,945
[45] Date of Patent: Mar. 12, 1996

[54] PAINT GUN INLET SUCTION SEAL

[75] Inventors: Timothy D. Steinberg, Coon Rapids; Mark E. Snetting, Eden Prairie; John M. Svendsen, Corcoran, all of Minn.

[73] Assignee: Wagner Spray Tech Corporation, Minneapolis, Minn.

[21] Appl. No.: 247,698

[22] Filed: May 23, 1994

[51] Int. Cl.⁶ .................................................. B67P 5/60
[52] U.S. Cl. .......................... 239/329; 239/333; 239/526; 222/464.1
[58] Field of Search ........................... 285/332, 345, 285/423, 352; 222/464; 239/340, 318, 310, 10, 600, 333, 330, 526, 375, 332

[56] References Cited

U.S. PATENT DOCUMENTS

| | | | |
|---|---|---|---|
| 2,125,573 | 8/1938 | Kelley | 234/354 X |
| 3,160,182 | 12/1964 | O'Donnell | 285/332 X |
| 3,197,194 | 7/1965 | Kochner | 239/354 X |
| 4,278,132 | 7/1981 | Hostetter | 239/310 X |
| 4,614,371 | 9/1983 | Bauder | 285/345 X |
| 4,760,962 | 8/1988 | Wheeler | 239/354 X |
| 5,381,961 | 1/1995 | Evans et al. | 239/333 |

FOREIGN PATENT DOCUMENTS 293277   9/1904   France ........................... 239/340

Primary Examiner—Kevin P. Weldon
Attorney, Agent, or Firm—Faegre & Benson

[57] ABSTRACT

A suction apparatus seal for portable paint spray guns having a suction apparatus received via mating conical surfaces in a salient inlet port, the seal formed of resilient, low-density polyethylene and having a radially inwardly directed lip sized to seal around the suction apparatus and a cylindrical mediate section sized to seal around the salient inlet port and a radially outwardly flared flange to aid in installing the seal on the inlet port of the spray gun. The seal also provides positive engagement of the suction apparatus when it is initially loosely engaged with the paint inlet of the gun.

18 Claims, 4 Drawing Sheets

PAINT GUN INLET SUCTION SEAL

BACKGROUND OF THE INVENTION

This invention relates to an improvement for hand-held paint spray guns, more particularly to sealing a paint inlet to the suction apparatus for such guns.

Referring now to FIGS. 1 and 2, in the past it has been known to use a hand-held spray gun 10 to spray paint drawn either from a cup 12 secured to a flange 14 on the gun or to use an extended suction set 16 to draw paint from a remote container 18. Container 18 can either be a paint can 20 in which the paint is sold, or a bucket 22, as desired by the user. With either the local paint cup 12 or the remote paint container 18, a syphon tube 24 is used to draw paint from the receptacle in which it is located. Syphon tube 24 preferably has a strainer or filter 26 at the suction end thereof to prevent oversize particle solids from entering and clogging gun 10.

The suction apparatus of either syphon tube 24 or suction set 16 of the prior art relied upon frictional interengagement of a tapered end of the suction apparatus mating with a tapered bore in a paint inlet of the spray gun. Because gun 10 uses a vibratory motor to atomize paint, the suction apparatus was subject to loosening and detachment from gun 10. Furthermore, when the suction apparatus was not positively engaged to the inlet port of gun 10 initially, the gun was unable to draw paint through the suction apparatus because of air linkage between the inlet port and the suction apparatus, thus preventing drawing paint into the gun for spraying.

Unanticipated separation of the extended suction set 16 from the gun 10 while paint was flowing would result typically in paint spillage, requiring additional and unanticipated clean-up.

The present invention overcomes shortcomings of the prior art by providing an inlet seal to provide apparatus and method for positive engagement of the suction apparatus with the paint inlet port to both initially make a positive engagement and to maintain such engagement throughout the spraying operation.

DETAILED DESCRIPTION OF THE INVENTION

Figure 3:
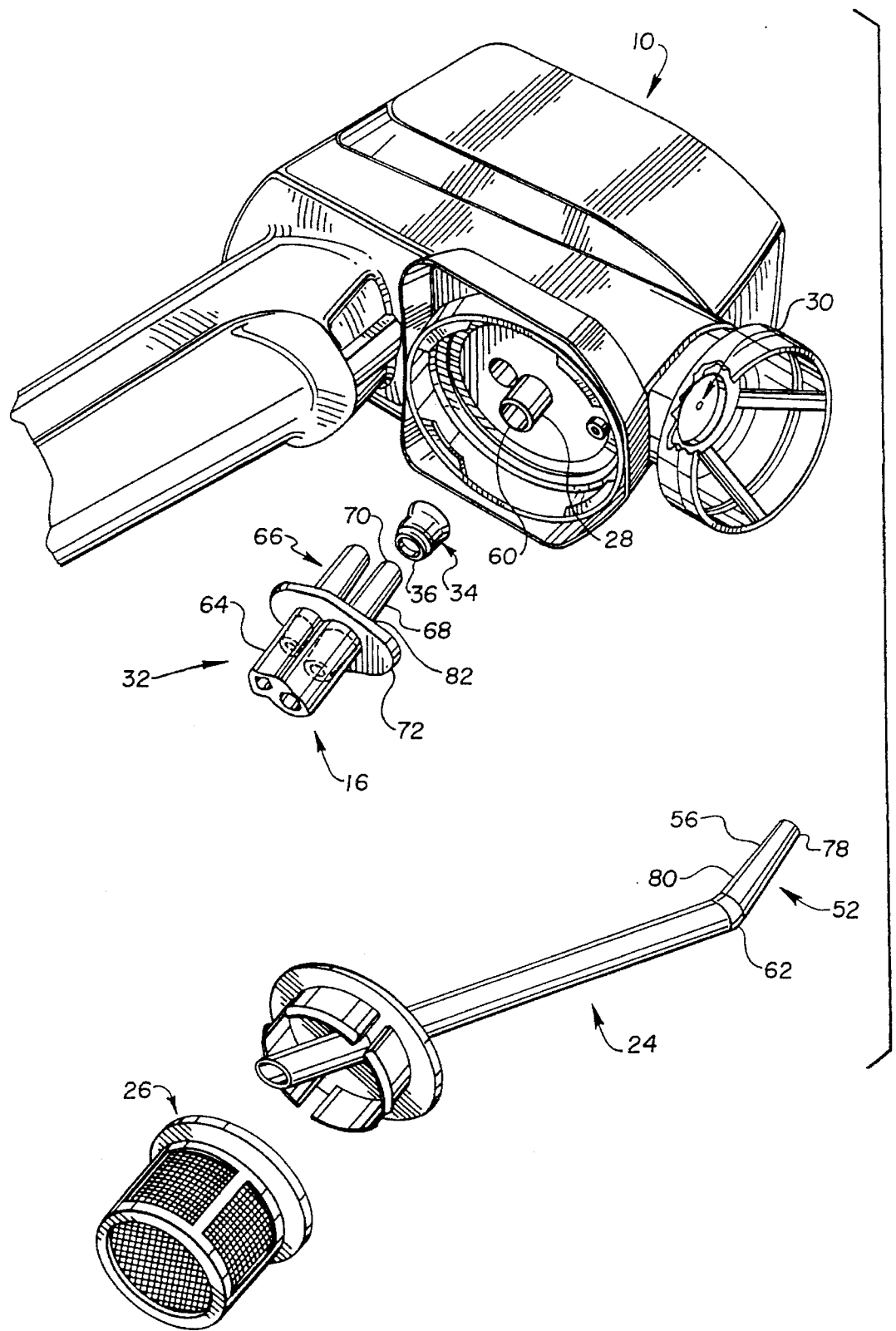
FIG. 3 shows a perspective view of the paint gun along with a fragmentary view of the extended suction set and an exploded view of the syphon tube of FIG. 1 along with a seal useful in the practice of the present invention.

Referring now to FIGS. 3–8, and most particularly to FIG. 3, the combination of the present invention may be seen. Spray gun 10 is of the type having a salient inlet port 28 connected to a piston pump (not shown) for atomizing paint by ejection it from a spray tip orifice 30 after drawing it into the pump through a suction apparatus 32 received in the salient inlet port 28. A resilient collar 34 surrounds the salient inlet port (as may be seen more clearly in FIGS. 6–8). The collar 34 has a radially inwardly flared lip 36 at one end 38 of the collar which, when assembled, extends past a projecting end 40 of the salient inlet port 28 to form an air tight seal 74 with the suction apparatus 32 received in the salient inlet port 28. Collar 34 is preferably formed of low density polyethylene and has a radially outwardly flared flange 42 at another end 46 of collar 34 for initially guiding the collar onto the salient inlet port 28. It is to be understood that the inlet port 28 preferably has a generally cylindrically shaped outer surface 50 and the collar 34 has a mediate portion 48 having a generally cylindrically shaped inner surface 52 sized to provide an interference fit with the outer surface 50 of the inlet port 28. This interference fit is designed to provide an air tight seal between surfaces 50 and 52 when the collar 34 is received on the port 28. It is to be understood that the radially outwardly flared flange 42 is preferably circular and concentric to the cylindrically shaped inner surface 52 of the mediate portion 48 of the collar 34.

Figure 5:
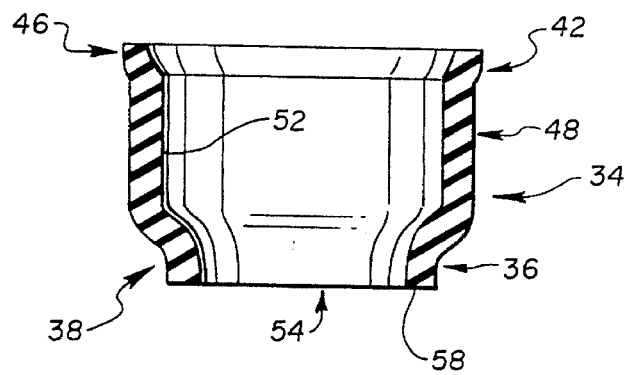
FIG. 5 is a sectional view taken along 5—5 of the seal of FIG. 4.
Figure 4:
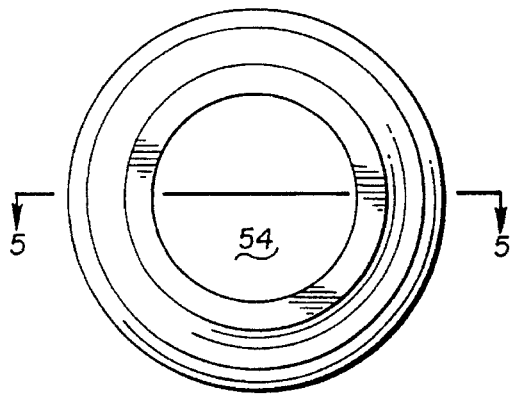
FIG. 4 shows an end view of the seal of FIG. 3.

In a first alternative, the suction apparatus 32 may be a syphon tube 24 having a tapered first end 52 adapted to be received in the inlet port 28 for drawing paint from the cup 12 attached to the gun 10. In this configuration, lip 36 of collar 34 has a circular opening 54 therein sized to seal syphon tube 24 to port 28 when it is received therein. More particularly, circular opening 54 in lip 36 is sized to seal against the taper 56 when first end 52 of the syphon tube 24 is received in the inlet port 28. Referring now most particularly to FIGS. 4 and 5, the lip 36 of collar 34 further includes a truncated cylindrical projection 58 having the circular opening 54 therein. It is to be further understood that inlet port 28 has an entry 60 (see FIG. 3) of a predetermined diameter and the circular opening 54 may be sized to have substantially the same diameter as that of the entry 60, or, in an alternative embodiment, circular opening 54 may have a diameter less than that of the diameter of entry 60 of inlet port 28.

When the suction apparatus 32 is in the form of the syphon tube 24 as shown in FIG. 3, it is further to be understood that the syphon tube has a cylindrical portion 62 connected to tapered end 52 which has a first diameter at the tip 78 and a second diameter distal of the tip (at location 80 in FIG. 3) larger than the first diameter, both of which are less than an outer diameter of the cylindrical portion 62. It is to be understood that with this configuration for suction apparatus 32, the circular opening 54 in collar 34 has a diameter greater than the tip diameter at end 52 and less than second diameter at location 80 and the outer diameter of the syphon tube cylindrical portion 62.

In a second alternative, the suction apparatus may be an extended suction set made up of a hose 64 and a tapered adapter 66. The tapered adapter has a cone-shaped portion 68 extending between a first diameter at the tip 70 and a second diameter distal of the tip and larger than the first diameter. The circular opening 54 in collar 34 is sized to have a diameter greater than the first diameter of tip 70 and less than the second diameter on the cone shaped portion 68 at a location 82 proximal flange 72.

Figure 2:
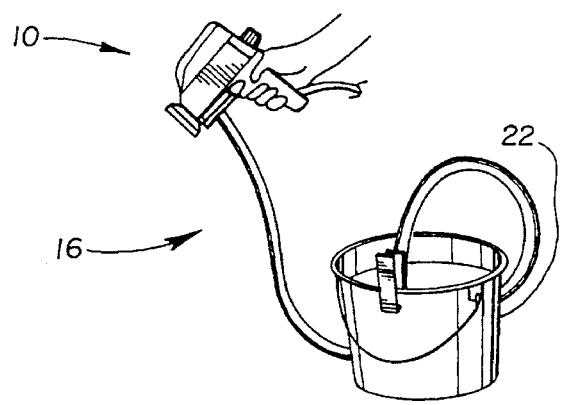
FIG. 2 shows the paint spray gun of FIG. 1 in operation with one suction apparatus of the form of an extended suction set drawing paint from a bucket remote from the gun.
Figure 1:
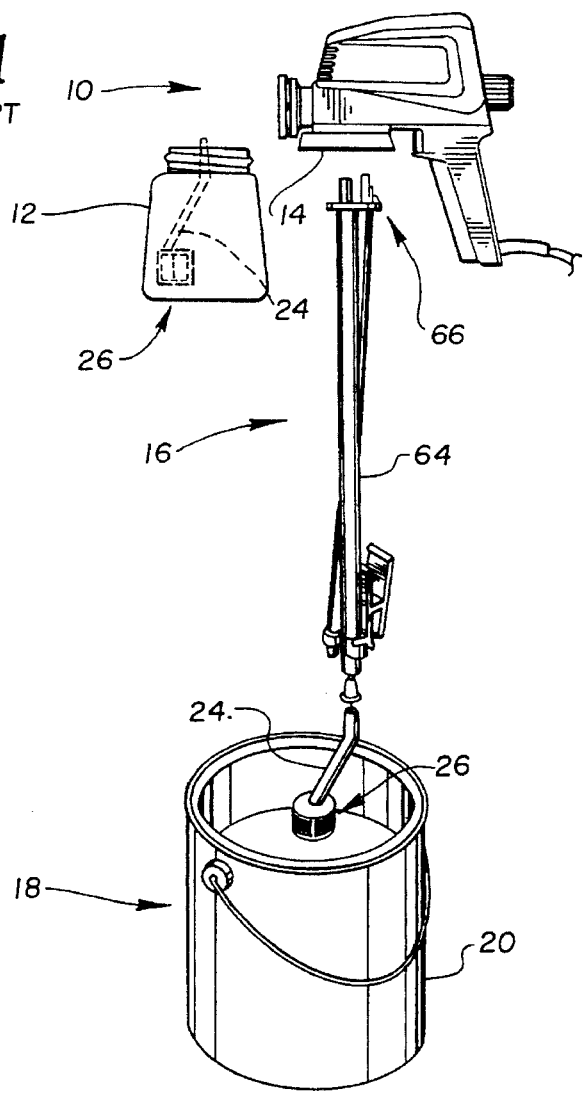
FIG. 1 shows an exploded view of a prior art paint spray gun and alternative suction apparatus and paint receptacles.
Figure 8:
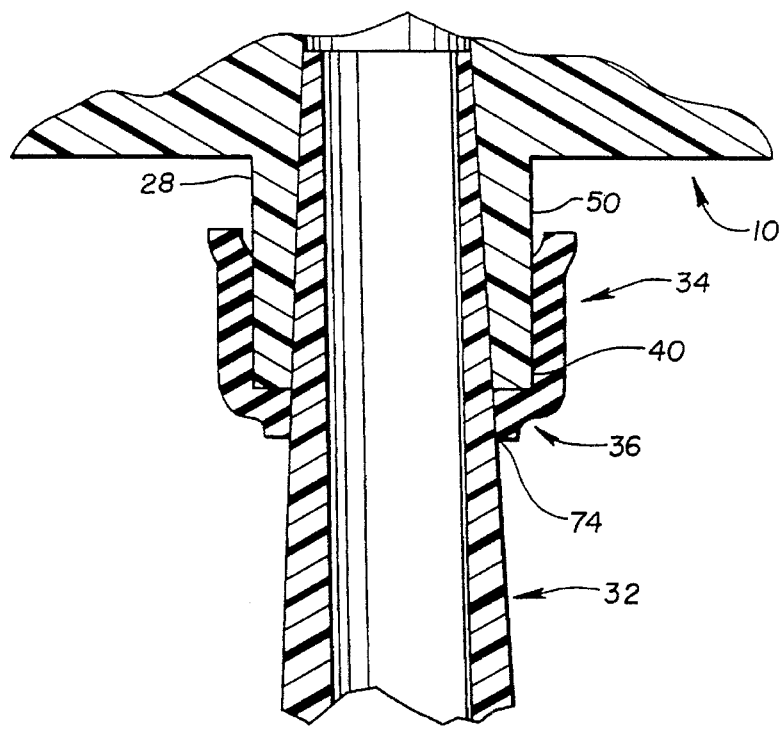
FIG. 8 is a view similar to FIGS. 6 and 7, except with the tapered end of the suction apparatus positively engaged with the inlet port.
Figure 6:
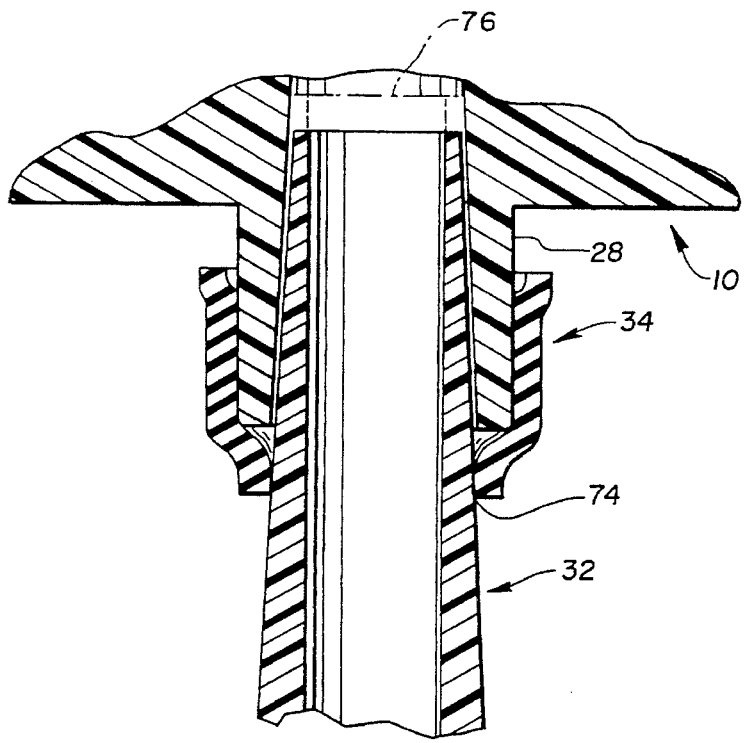
FIG. 6 is a fragmentary section view of a tapered end portion of the suction apparatus loosely engaged in an inlet port of the gun illustrating the sealing action with the suction apparatus aligned with the inlet port.
Figure 7:
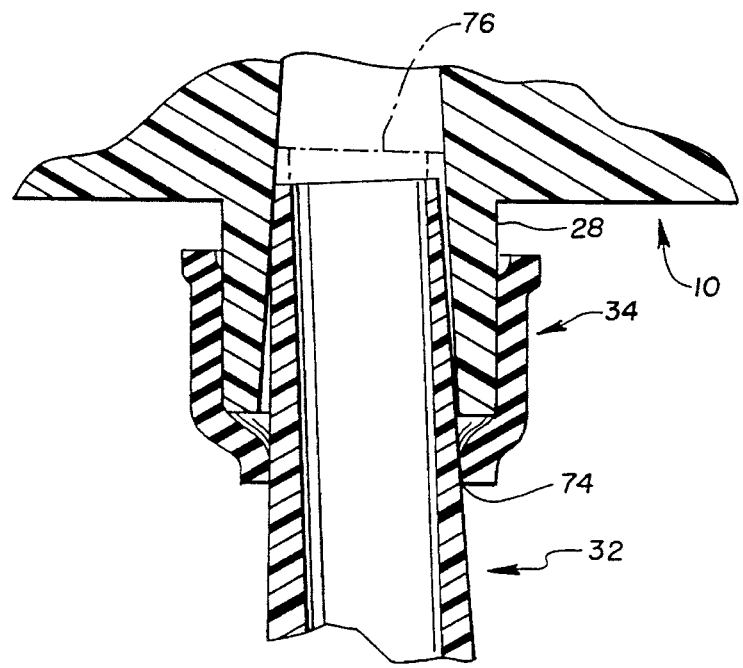
FIG. 7 is a view similar to FIG. 6 showing the sealing action with the suction apparatus loosely engaged and misaligned with the inlet port.

Referring now more particularly to FIGS. 6, 7, and 8, certain operating features of the present invention may be seen. The present invention includes a method of sealing and securing positive engagement of a loosely engaged suction apparatus 32 to the inlet port 28 of the hand-held paint spraying gun 10. The method includes the steps of enclosing a junction between the inlet 28 and suction apparatus 32 with a resilient collar 34 to form an airtight seal 74 between the inlet 28 and the suction apparatus 32 (which may be either the tapered adapter 66 of the extended suction set 16 or the tapered end 52 of the syphon tube 24. Next the paint spraying gun 10 is operated in a manner similar to that of FIG. 2 to create a vacuum by drawing paint into the suction apparatus 32 loosely received at the inlet 28 of the paint spraying gun 10, such that the loosely engaged suction apparatus 32 is drawn towards inlet 28 by the vacuum maintained by the collar 34 until the suction apparatus 32 is positively engaged (as shown in FIG. 8) with the inlet 28. It is to be understood that FIG. 6 shows a loosely engaged suction apparatus 32 positioned in alignment with inlet 28, while FIG. 7 shows a misaligned suction apparatus 32 to illustrate that air tight seal 74 is maintained even in the face of misalignment of the suction apparatus 32 with the inlet port 28. In FIGS. 6 and 7, the completely inserted and positively engaged position of suction apparatus 32 and port 28 is shown by phantom line 76.

It is also to be noted that as the matingly conically tapered portions of the suction apparatus 32 and inlet 28 move from the condition shown in either FIG. 6 or FIG. 7 to the condition shown in FIG. 8, that it is typical, although not required, that lip 36 of collar 34 will deform towards the projecting end 40 of port 28 (as shown in FIG. 8) because of the increasing diameter of the conical section of suction apparatus 32, deforming the collar into a more positive seal between the suction apparatus 32 and inlet 28 as the suction apparatus 32 is drawn towards the inlet 28.

It is further to be understood that in the event that suction apparatus 32 were to become loosened during operation, as for example while the spray gun is being moved (without spraying) with the extended suction set 16 connected to gun 10, the suction apparatus 32 may loosen from the condition shown in FIG. 8 to either of the conditions shown in FIGS. 6 or 7. In the event that such loosening occurs, the collar will restore the suction apparatus to the condition shown in FIG. 8 provided that the air tight seal 74 is not broken when the suction apparatus 32 is loosened from the gun 10.

The invention is not to be taken as limited to all of the details thereof as modifications and variations thereof may be made without departing from the spirit or scope of the invention.

What is claimed is:

1. An improvement for a paint pump having a salient inlet port and suction tube apparatus received therein, the improvement in combination therewith comprising a collar having a radially inwardly flared lip at one end thereof and wherein the collar is formed of a resilient material directly sealing the collar to the suction tube apparatus at the lip when the suction tube apparatus is frictionally interengaged with the salient inlet port.

2. The suction tube coupling apparatus of claim 1 wherein the collar is formed of low density polyethylene.

3. The suction tube coupling apparatus of claim 1 wherein the collar further comprises a radially outwardly flared flange at another end thereof.

4. The suction tube coupling apparatus of claim 1 wherein the collar further has a mediate portion having a generally cylindrically shaped inner surface and the radially outwardly flared flange is circular and concentric to the cylindrically shaped inner surface of the mediate portion of the collar.

5. The suction tube coupling apparatus of claim 1 wherein the lip of the collar comprises a truncated cylindrical projection having a circular opening therein.

6. A method of sealing and securing positive engagement of a loosely engaged suction apparatus to an inlet of a hand-held paint spraying gun comprising the steps of:

a) enclosing a junction of an inlet of a hand-held paint spraying gun and a loosely engaged paint suction apparatus with a resilient collar having an inwardly flared lip at one end thereof to form an air-tight seal between the inlet and the suction apparatus; and b) operating the paint spraying gun to draw paint to create a vacuum at the suction apparatus loosely received at the inlet of the paint spraying gun such that the loosely engaged suction apparatus is drawn towards the inlet by the vacuum maintained by the collar until the suction apparatus is positively engaged with the inlet.

7. The method of claim 6 wherein the suction apparatus and inlet are matingly conically tapered and step a) further comprises forming an air-tight seal between the suction apparatus and the inlet.

8. The method of claim 6 wherein the collar is deformed into a more positive seal between the suction apparatus and inlet as the suction apparatus is drawn towards the inlet.

9. The method of claim 6 wherein the suction apparatus comprises a syphon tube.

10. The method of claim 6 wherein the suction apparatus comprises an extended suction set having an elongate flexible hose and a tapered adapter.

11. A hand-held paint spraying gun comprising a salient inlet port and a suction apparatus received therein and frictionally interengaged therewith, the salient inlet port connected to a piston pump for atomizing paint by ejecting it from a spray tip orifice after drawing it into the pump through the suction apparatus received in the salient inlet port, and a resilient collar surrounding the salient inlet port, the collar having a radially inwardly flared lip at one end thereof extending past a projecting end of the salient inlet port to contact and directly form a seal with the suction apparatus received in the salient inlet port.

12. The paint spraying gun of claim 11 wherein the inlet port further comprises a generally cylindrically shaped outer surface and the collar further has a mediate portion having a generally cylindrically shaped inner surface sized to provide an interference fit with the outer surface of the inlet port.

13. The paint spraying gun of claim 11 wherein the suction apparatus comprises a syphon tube having a tapered first end adapted to be received in the inlet port for drawing paint from a cup attached to the gun and wherein the lip of the collar has a circular opening therein sized to seal to the syphon tube when it is received in the inlet port.

14. The paint spraying gun of claim 13 wherein the circular opening in the lip of the collar is sized to seal against the taper when the first end of the syphon tube is received in the inlet port.

15. The paint spraying gun of claim 11 wherein the inlet port comprises an entry of predetermined diameter and the circular opening of the collar has substantially the same diameter as that of the entry of the inlet port.

16. The paint spraying gun of claim 11 wherein the suction apparatus comprises a syphon tube for drawing paint from a cup attached to the gun and wherein the syphon tube has a cylindrical portion connected to a tapered end with a tip diameter less than an outer diameter of the cylindrical portion and wherein the circular opening of the collar has a diameter greater than the tip diameter and less than the outer diameter of the syphon tube.

17. The paint spraying gun of claim 11 wherein the suction apparatus comprises an extended suction hose and tapered adapter to couple the hose to the inlet port for drawing paint from a receptacle remote from the gun and wherein the tapered adapter has a cone-shaped portion extending between a first diameter at the tip and a second diameter distal of the tip and larger than the first diameter and wherein the circular opening of the collar has a diameter greater than the first diameter and less than the second diameter of the adapter.

18. The paint spraying gun of claim 11 wherein the circular opening of the collar has a diameter less than that of the entry of the inlet port.

* * * * *